US011713058B2

(12) United States Patent
Fukuzawa et al.

(10) Patent No.: US 11,713,058 B2
(45) Date of Patent: Aug. 1, 2023

(54) VEHICLE CONTROL SYSTEM, ATTACK JUDGING METHOD, AND RECORDING MEDIUM ON WHICH PROGRAM IS RECORDED

(71) Applicant: TOYOTA JIDOSHA KABUSHIKI KAISHA, Toyota (JP)

(72) Inventors: Teppei Fukuzawa, Toyota (JP); Takeshi Matsui, Toyota (JP); Yoshinari Takeyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 285 days.

(21) Appl. No.: 17/193,027

(22) Filed: Mar. 5, 2021

(65) Prior Publication Data

US 2021/0300432 A1 Sep. 30, 2021

(30) Foreign Application Priority Data

Mar. 25, 2020 (JP) .................................. 2020-055168

(51) Int. Cl.
*B60W 60/00* (2020.01)
*H04L 9/40* (2022.01)
(Continued)

(52) U.S. Cl.
CPC ... *B60W 60/00188* (2020.02); *B60R 16/0231* (2013.01); *B60W 50/04* (2013.01); *H04L 63/1441* (2013.01)

(58) Field of Classification Search
CPC ............ B60W 60/00188; B60W 50/04; B60R 16/0231; H04L 63/1441
See application file for complete search history.

(56) References Cited

U.S. PATENT DOCUMENTS

2016/0297401 A1 10/2016 Haga et al.
2016/0347326 A1* 12/2016 Iwagami ............... B60W 10/06
(Continued)

FOREIGN PATENT DOCUMENTS

JP   2004-328488 A   11/2004
JP   2008-271040 A   11/2008
(Continued)

*Primary Examiner* — Geepy Pe
*Assistant Examiner* — Clint Pham
(74) *Attorney, Agent, or Firm* — Oliff PLC

(57) ABSTRACT

A vehicle control system comprising: a driving control device that includes a first processor and controls a driving section at a vehicle; a control instructing device includes a second processor and controls the driving control device by giving instructions by communication to the driving control device; and a communication path connects a plurality of control devices, including the control instructing and the driving control devices, the plurality of control devices communicate with one another, wherein the vehicle control system is structured wherein the first and second processors respectively compare a communication period of communication with another control device via the communication path, and a reference period that is stored in advance, based on results of comparisons on the communication period and the reference period that have been carried out by the first processor and the second processor, the second processor judges that there is an attack on the communication path.

8 Claims, 5 Drawing Sheets

(51) Int. Cl.
*B60R 16/023* (2006.01)
*B60W 50/04* (2006.01)

(56) References Cited

U.S. PATENT DOCUMENTS

| | | |
|---|---|---|
| 2017/0361808 A1 | 12/2017 | Haga et al. |
| 2018/0126954 A1 | 5/2018 | Haga et al. |
| 2019/0141070 A1* | 5/2019 | Tsurumi .................. B60R 1/00 |
| 2019/0332778 A1 | 10/2019 | Okuyama |

FOREIGN PATENT DOCUMENTS

| | | |
|---|---|---|
| JP | 2018-160786 A | 10/2018 |
| JP | 6407981 B2 | 10/2018 |
| JP | 2019-191063 A | 10/2019 |

\* cited by examiner

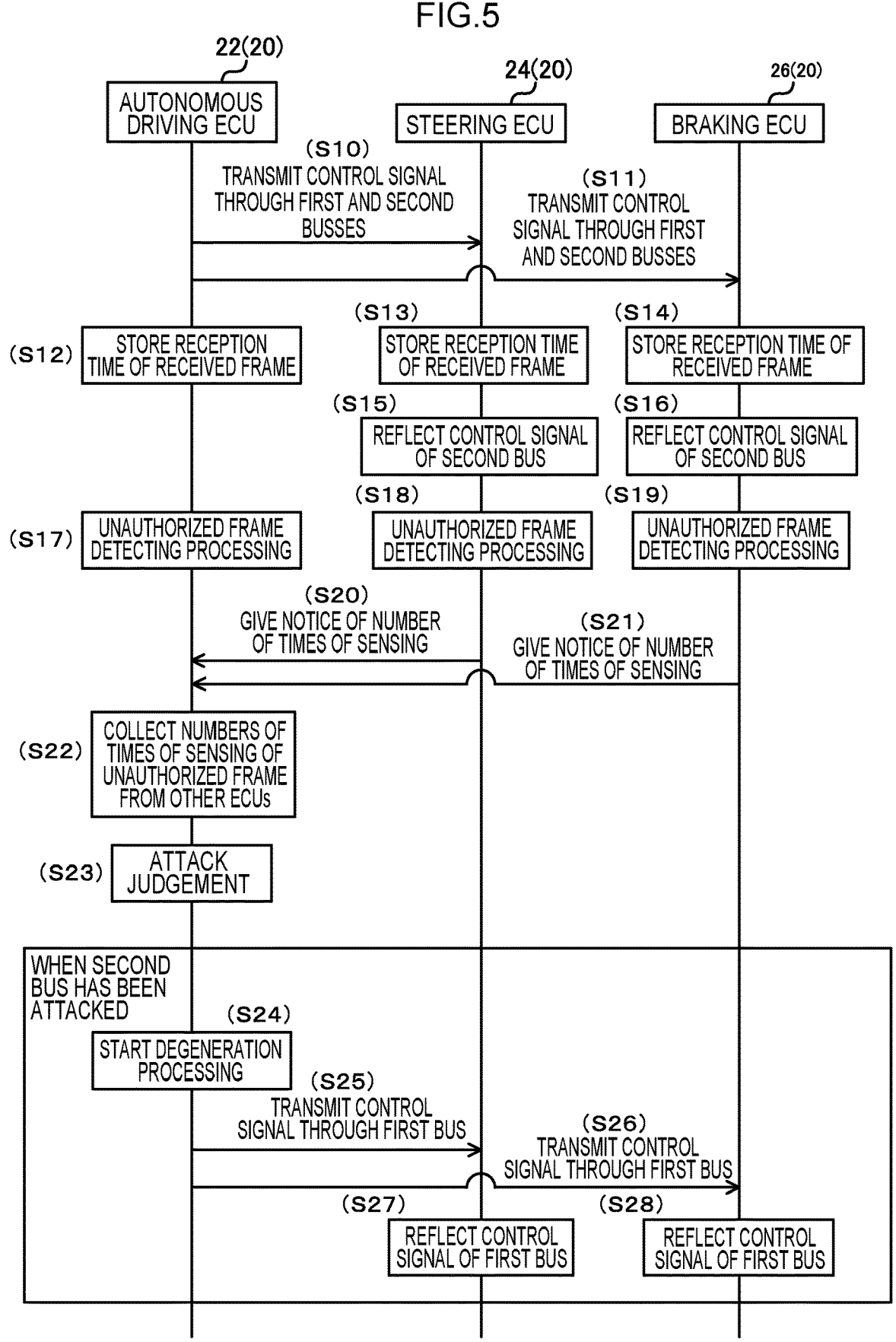

VEHICLE CONTROL SYSTEM, ATTACK JUDGING METHOD, AND RECORDING MEDIUM ON WHICH PROGRAM IS RECORDED

CROSS-REFERENCE TO RELATED APPLICATION

This application is based on and claims priority under 35 USC 119 from Japanese Patent Application No. 2020-055168 filed on Mar. 25, 2020, the disclosure of which is incorporated by reference herein.

BACKGROUND

Technical Field

The present disclosure relates to a vehicle control system, an attack judging method, and a recording medium on which a program is recorded.

Related Art

Japanese Patent No. 6407981 discloses an onboard network system having plural electronic control units that, in accordance with CAN (Controller Area Network) protocol and via at least one bus, carry out transmitting and receiving of data frames to which MACs (Message Authentication Codes) are appended.

On the other hand, the load on the vehicle network increases due to communication for message authentication being carried out.

SUMMARY

An object of the present disclosure is to provide a vehicle control system, an attack judging method and a recording medium on which a program is recorded, which can carry out judgement of a communication abnormality, such as an attack on an in-vehicle network from the exterior or the like, while reducing the load on the vehicle network.

A first aspect is a vehicle control system including: a driving control device that is a control device that controls a driving section provided at a vehicle; a control instructing device that is a control device that controls the driving control device by giving instructions by communication to the driving control device; a communication path that connects plural control devices, including the control instructing device and the driving control device, such that the plural control devices can communicate with one another; a comparing section that is provided at each of the control instructing device and the driving control device, and that compares a communication period of communication with another control device via the communication path, and a reference period that is stored in advance; and an attack judging device that is provided at the control instructing device and that, on the basis of results of comparisons by the respective comparing sections of the control instructing device and the driving control device, judges an attack on the communication path.

In the vehicle control system of the first aspect, the driving control device drives the driving section due to the control instructing device transmitting control signals to the driving control device through the communication path. In this vehicle control system, the comparing sections, which are provided at the control instructing device and the driving control device respectively, compare a communication period of communication of the communication path and a reference period that is stored in advance, and, on the basis of the results of comparisons of the respective comparing sections, the attack judging section judges an attack on the communication path.

Therefore, in accordance with this vehicle control system, an attack on a vehicle network can be judged without using message authentication. Namely, judgement of a communication abnormality, such as an attack on an in-vehicle network from the exterior or the like, can be carried out while reducing the load on the vehicle network.

In a vehicle control system of a second aspect, in the vehicle control system of the first aspect, the control instructing device and the driving control device each have an authenticating section that carries out message authentication on communication with other control devices, and, for a first type of information, the attack judging section judges an attack on the communication path on the basis of message authentication executed by the authenticating section, and, for a second type of information that is different than the first type of information, the attack judging section judges an attack on the communication path on the basis of results of comparison of the comparing section.

In the vehicle control system of the second aspect, for the first type of information, an attack on the communication path is judged on the basis of message authentication. For the second type of information, an attack on the communication path is judged on the basis of results of comparison of the communication period and the reference period. In accordance with this vehicle control system, because message authentication is not needed for some of the communications at the control path, communication abnormality judgement can be carried out while reducing the load on the vehicle network.

In a vehicle control system of a third aspect, in the vehicle control system of the second aspect, the first type of information is information that is higher risk than the second type of information, at a time of judging an attack on the communication path.

In a case in which the communication path has been attacked, the vehicle control system of the third aspect carries out message authentication on high-risk information. In accordance with this vehicle control system, the load on the vehicle network can be reduced while security is ensured, by providing a more reliable authenticating means for high-risk information.

In a vehicle control system of a fourth aspect, in the vehicle control system of any one of the first through third aspects, the control instructing device is an ECU for driving assist, and the control instructing device transmits, via the communication path and to the driving control device, control signals for controlling the driving section for vehicle traveling.

In accordance with the vehicle control system of the fourth aspect, the reliability of communications at an autonomous vehicle can be improved due to control signals, which relate to autonomous driving, being transmitted via the communication path at which security is ensured.

In a vehicle control system of a fifth aspect, the vehicle control system of any one of the first through fourth aspects includes: another communication path that is independent from the communication path and that connects plural control devices, including the control instructing device and the driving control device, such that the plural control devices can communicate with one another, wherein, in a case in which the attack judging section judges that there is an attack on the communication path, the control instructing device carries out communication with the driving control device via only the another communication path.

In accordance with the vehicle control system of the fifth aspect, plural control devices are connected so as to be able to communicate, by both the communication path and the another communication path. In a case in which there is an attack on the communication path, communication between control devices is carried out through the another communication path. Therefore, in accordance with this vehicle control system, even if there is an attack on the communication path, control of the driving section can be continued by communication of the another communication path.

A method of judging an attack of a sixth aspect is a method of judging an attack on a communication path that connects together plural control devices including a driving control device, which controls a driving section provided at a vehicle, and a control instructing device, which controls the driving control device, the method including: comparing processing that is executed at the control instructing device and the driving control device, respectively, and that compares a communication period of communication with another control device via the communication path, and a reference period that is stored in advance; and attack judging processing that is executed at the control instructing device, and that judges an attack on the communication path on the basis of results of comparison in the comparing processing.

The method of judging an attack of the sixth aspect is applied to a case in which the driving control device drives the driving section, due to the control instructing device giving instructions to the driving control device through a communication path in a vehicle. In this method of judging an attack, in the comparing processing that is executed at each of the control instructing device and the driving control device, a communication period of communication on the communication path and a reference period that is stored in advance are compared. In the attack judging processing, an attack on the communication path is judged on the basis of the results of comparisons of the comparing processing. Therefore, in accordance with this method of judging an attack, an attack on a vehicle network can be judged without using message authentication. Namely, judgement of a communication abnormality, such as an attack on an in-vehicle network from the exterior or the like, can be carried out while reducing the load on the vehicle network.

The seventh aspect is a non-transitory recording medium on which a program is recorded. The program is a program that judges an attack on a communication path that connects together plural control devices including a driving control device, which controls a driving section provided at a vehicle, and a control instructing device, which controls the driving control device, and the program causes a computer, which is provided with the control instructing device, to execute processings including: comparing processing that compares a communication period of communication with another control device via the communication path, and a reference period that is stored in advance; and attack judging processing that judges an attack on the communication path on the basis of results of comparison in the comparing processing.

The program, which is recorded on the non-transitory recording medium of the seventh aspect, is applied to a case in which the driving control device drives the driving section, due to the control instructing device giving instructions to the driving control device through a communication path in a vehicle. In this program, in a case in which the control instructing device gives an instruction to the driving control device, a computer that is provided with the control instructing device executes the following processings. Namely, in the comparing processing, a communication period of communication on the communication path and a reference period that is stored in advance are compared. In the attack judging processing, an attack on the communication path is judged on the basis of the results of comparison of the comparing processing. Therefore, in accordance with this program, an attack on a vehicle network can be judged without using message authentication. Namely, judgement of a communication abnormality, such as an attack on an in-vehicle network from the exterior or the like, can be carried out while reducing the load on the vehicle network.

In accordance with the present disclosure, judgement of a communication abnormality, such as an attack on an in-vehicle network from the exterior or the like, can be carried out while reducing the load on the vehicle network.

BRIEF DESCRIPTION I/F THE DRAWINGS

An exemplary embodiment of the present disclosure will be described in detail based on the following figures, wherein:

FIG. 5 is a sequence drawing showing the flow of processings that are executed at respective ECUs in the embodiment.

DETAILED DESCRIPTION

Figure 1:
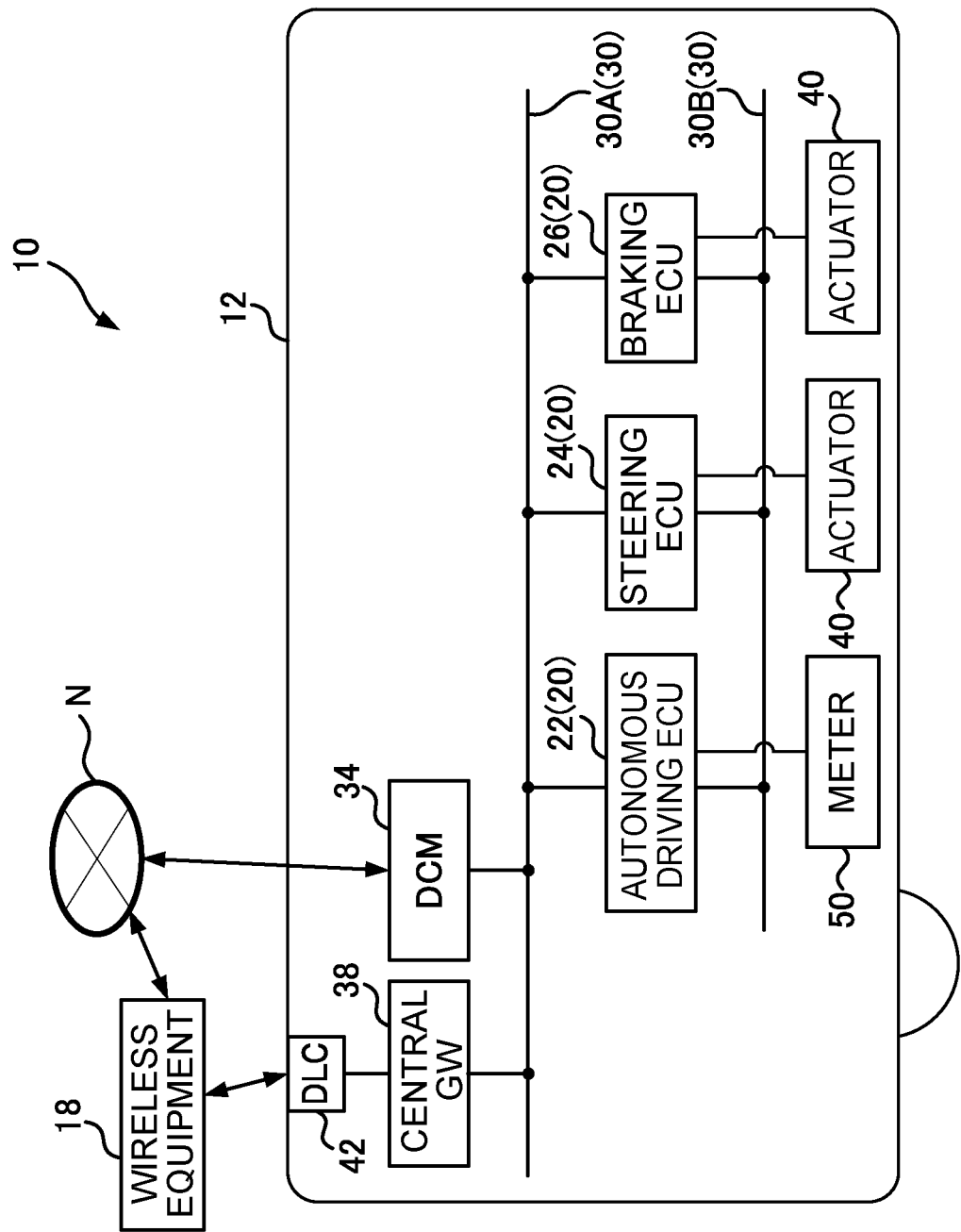
FIG. 1 is a drawing showing the schematic structure of a vehicle control system relating to an embodiment.

FIG. 1 is a block drawing showing the schematic structure of a vehicle control system 10 relating to an embodiment of the present disclosure.

(Basic Structure)

As shown in FIG. 1, the vehicle control system 10 relating to the present embodiment is provided at a vehicle 12 at which autonomous driving is possible.

The vehicle control system 10 of the present embodiment is structured to include plural ECUs (Electronic Control Units) 20, in-vehicle busses 30 that are communication paths that connect the plural ECUs 20 to one another, a DCM (Data Communication Module) 34, and a central GW (Central Gateway) 38.

The ECUs 20 function as control devices that control respective sections of the vehicle 12. The ECUs 20 include an autonomous driving ECU 22, a steering ECU 24, and a braking ECU 26. Note that, although not illustrated, the ECUs 20 include a body ECU, an engine ECU, a transmission ECU, a meter ECU, a multimedia ECU, a smart key ECU and the like. The autonomous driving ECU 22 is an ECU for driving assist, and is an example of the control instructing device. Further, the steering ECU 24 and the braking ECU 26 are the ECUs 20 for driving control, and are examples of driving control devices.

Actuators 40 are connected to the steering ECU 24 and the braking ECU 26, respectively, and the respective actuators 40 are driven on the basis of control signals of the autonomous driving ECU 22. Namely, in the vehicle 12 of the present embodiment, autonomous driving is realized by the ECUs 20, such as the steering ECU 24 and the braking ECU 26 and the like, driving the actuators 40 on the basis of control signals transmitted from the autonomous driving ECU 22. The detailed structures of the ECUs 20 are described later.

The in-vehicle busses 30 connect the respective ECUs 20 to one another. The in-vehicle busses 30 include a first bus 30A, which can connect to a network N at the exterior of the vehicle 12, and a second bus 30B, which is independent from the first bus 30A and is cut-off from external networks. In addition to the respective ECUs 20, the DCM 34 and the central GW 38 are connected to the first bus 30A.

At the in-vehicle busses 30, communication in accordance with CAN (Controller Area Network) protocol is carried out. The first bus 30A is an example of the another communication path, and the second bus 30B is an example of the communication path.

The DCM 34 is provided as a communication device that connects the vehicle 12 and the network N that is a communication network. As described above, the DCM 34 is connected to the first bus 30A.

The central GW 38 has the functions of managing the network and communicating data. As described above, the central GW 38 is connected to the first bus 30A. Note that plural buses that are not illustrated are connected in addition to the first bus 30A.

The central GW 38 is connected to a DLC (Data Link Connector) 42. This DLC 42 can connect with wireless equipment 18. Namely, the central GW 38 is structured so as to be able to connect to the network N via the wireless equipment 18.

(ECU)

Figure 2:
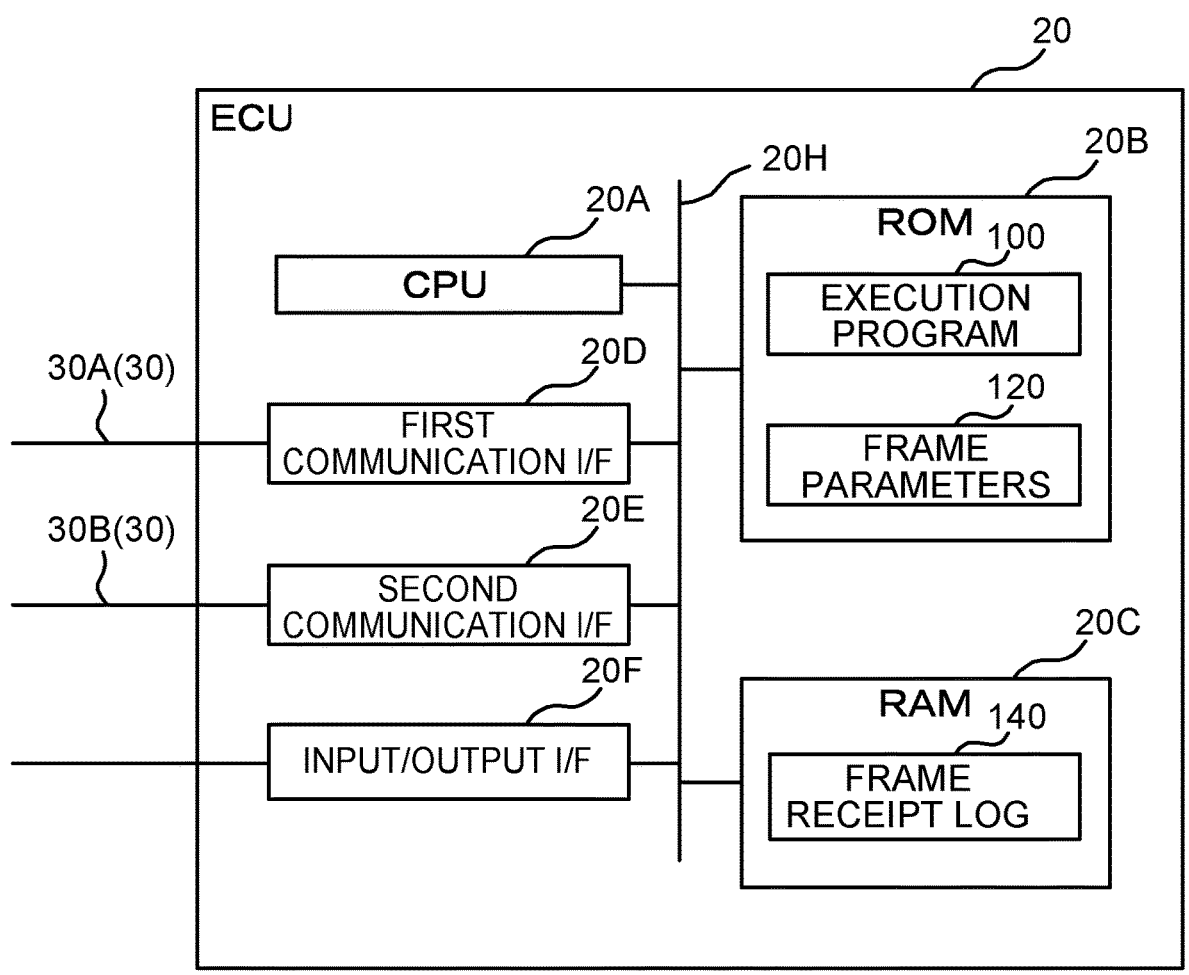
FIG. 2 is a block drawing showing hardware structures of an ECU of the embodiment.

As shown in FIG. 2, the ECU 20 is structured to include a CPU (Central Processing Unit) 20A, a ROM (Read Only Memory) 20B, a RAM (Random Access Memory) 20C, a first communication I/F (Inter Face) 20D, a second communication I/F 20E, and an input/output I/F 20F. The CPU 20A, the ROM 20B, the RAM 20C, the first communication I/F 20D, the second communication I/F 20E, and the input/output I/F 20F are connected so as to be able to communicate with one another via an internal bus 20H. The CPU 20A is an example of the processor, and the RAM 20C is an example of the memory.

The CPU 20A is a central computing processing unit, and executes various programs and controls respective sections. Namely, the CPU 20A reads-out programs from the ROM 20B, and executes the programs by using the RAM 20C as a workspace.

The ROM 20B that serves as the storage stores various programs and various data. In the present embodiment, an execution program 100 is stored in the ROM 20B. The execution program 100 is a program for carrying out processings relating to attack monitoring and attack handling that are described later. Further, frame parameters 120 are stored in the ROM 20B. The frame parameters 120 store reference periods which are the intervals between frames that are communicated through the respective in-vehicle busses 30. The RAM 20C temporarily stores programs or data as a workspace. A frame receipt log 140 is stored in the RAM 20C. The times of receipt when frames are received from the other ECUs 20 are stored in the frame receipt log 140.

The first communication I/F 20D is an interface for connection with the other ECUs 20. This interface uses communication standards in accordance with CAN protocol. The first communication I/F 20D is connected to the first bus 30A.

The second communication I/F 20E is an interface for connection with the other ECUs 20. This interface uses communication standards in accordance with CAN protocol. The second communication I/F 20E is connected to the second bus 30B.

Note that, in the present embodiment, the first communication I/F 20D and the second communication I/F 20E are provided as different interfaces, but the present disclosure is not limited to this, and one communication interface may be connected to the first bus 30A and the second bus 30B. In this case, the communication of the first bus 30A and the communication of the second bus 30B are independent, such as the first bus 30A and the second bus 30B are connected to different channels, or the like.

The input/output I/F 20F is an interface for communicating with the actuator 40 or a meter 50. In detail, the actuator 40 is connected to the input/output I/F 20F of the ECU 20 for driving control, and the meter 50 is connected to the input/output I/F 20F of the autonomous driving ECU 22. Note that the meter 50 may be connected via a meter ECU. Note that the equipment that are connected to the input/output I/F 20F are not limited to the actuator 40 and the meter 50, and other sensors may be connected thereto.

(Autonomous Driving ECU)

Figure 3:
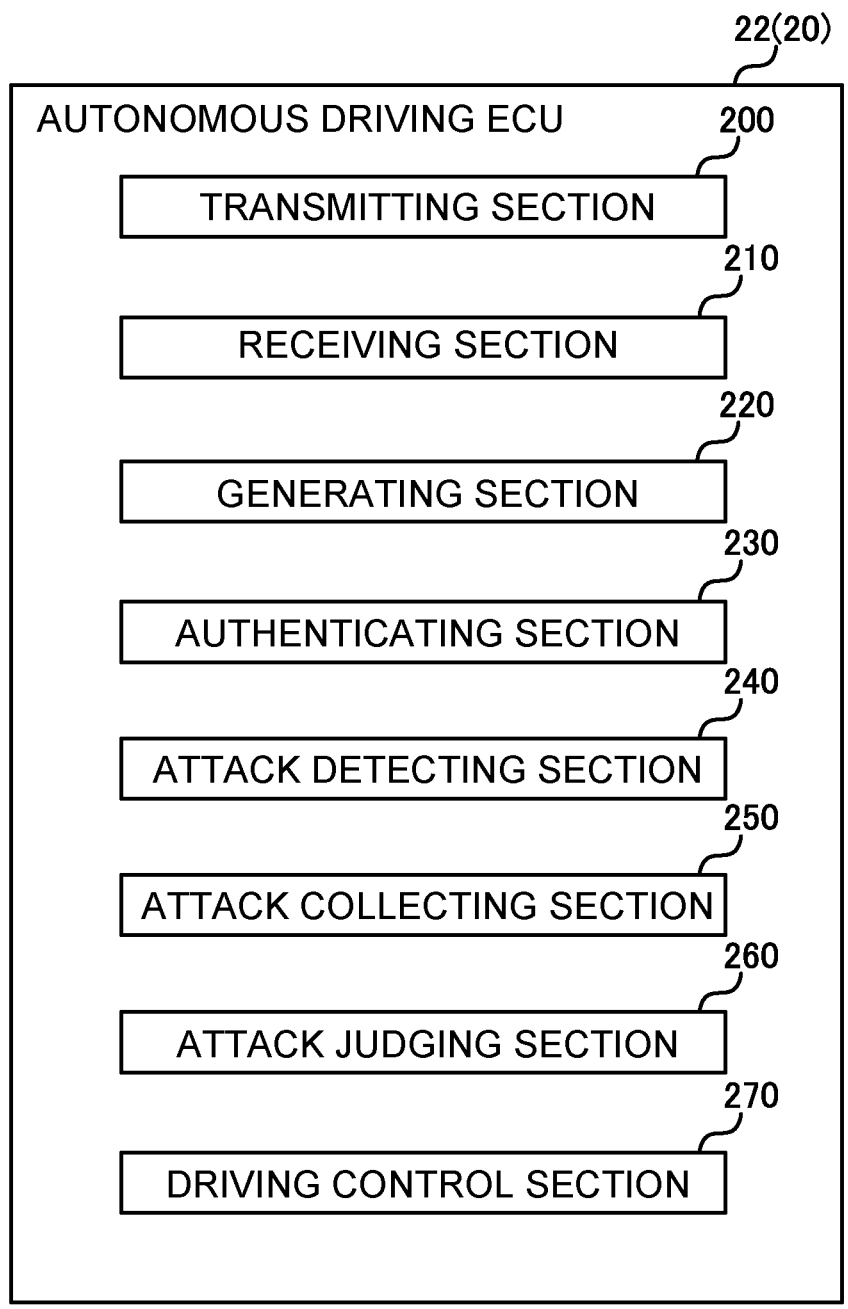
FIG. 3 is a block drawing showing an example of functional structures of an autonomous driving ECU of the embodiment.

FIG. 3 is a block drawing showing an example of the functional structures of the autonomous driving ECU 22. As shown in FIG. 3, the autonomous driving ECU 22 has a transmitting section 200, a receiving section 210, a generating section 220, an authenticating section 230, an attack detecting section 240, an attack collecting section 250, an attack judging section 260, and a driving control section 270. These respective functional structures are realized by the CPU 20A reading-out the execution program 100 that is stored in the ROM 20B, and executing the execution program 100.

The transmitting section 200 has the function of transmitting communication frames toward the other ECUs 20. Namely, the transmitting section 200 can output a communication frame to both the first bus 30A and the second bus 30B. Here, the communication frame includes a CAN ID and communication data.

Note that the communication data that are transmitted through the first bus 30A and the second bus 30B can include a MAC (Message Authentication Code) that is an authentication code for the message. For example, message authentication is carried out on control signals that relate to emergency stopping of the vehicle 12. Namely, the transmitting section 200 appends a MAC that is generated at the generating section 220 to the message of a control signal that relates to braking or the steering angle, and transmits the message. In contrast, message authentication is not carried out on control signals that are other than those relating to emergency stopping, and the transmitting section 200 transmits only the control signal. Here, a control signal relating to emergency stopping is information that is high-risk at the time of attack judgement at the communication path, and corresponds to the first type of information. Further, control signals that are other than those relating to emergency stopping correspond to the second type of information.

The receiving section 210 has the function of receiving communication frames from the other ECUs 20. Namely, the receiving section 210 acquires communication frames from both the first bus 30A and the second bus 30B.

The generating section 220 has the function of generating a MAC from predetermined data by using an encryption key. In a case in which the ECU 20 is at the transmitting side, the generating section 220 executes computing processing on the basis of the message to be transmitted and the encryption key, and generates the MAC. On the other hand, in a case in which the ECU 20 is at the receiving side, the generating section 220 executes computing processing on the basis of the encryption key and the message that was received from the ECU 20 at the transmitting side, and generates a MAC for verification. A common key that is used in common at the transmitting side and the receiving side is used as the encryption key in the present embodiment.

The authenticating section 230 has the function of authenticating the message. The authenticating section 230 authenticates the message in a case of comparing the MAC included in the received communication data and the MAC for verification generated from the received message, and both of these match. Further, in a case in which authentication of a message fails, the authenticating section 230 counts the number of times of authentication failure.

The attack detecting section 240 that serves as the comparing section has the function of judging whether or not a frame received from the other ECU 20 is an unauthorized frame. This attack detecting section 240 carries out a judging as to whether or not an unauthorized frame has been inserted, on the basis of the frame receipt log 140 and the frame parameters 120. Concretely, the attack detecting section 240 computes the communication period from the difference between the time of reception of a predetermined frame that is stored in the frame receipt log 140, and the time of reception of the frame received one before that, and compares this communication period and a reference period that is stored in the frame parameters 120.

Then, in a case in which the communication period and the reference period do not match, and in further detail, in a case in which the communication period is not within the error range that is allowed for the reference period, the predetermined frame at the time when that communication period was computed is detected as an unauthorized frame.

The attack collecting section 250 has the function of collecting the number of times of sensing of an unauthorized frame that was notified from each of the other ECUs 20. Concretely, the sensed number of times that was notified from the attack notification section 280, which is described later, of the ECU 20 for driving control, is acquired. Further, the attack collecting section 250 can acquire the number of times of authentication failure notified from each of the other ECUs 20.

The attack judging section 260 has the function of judging whether or not the vehicle network is under attack. The attack judging section 260 judges that the in-vehicle bus 30 is under attack in a case in which the total of the sensed number of times of unauthorized frames acquired from the attack detecting section 240, and the sensed number of times of unauthorized frames acquired from the attack collecting section 250, exceeds a predetermined threshold value. Further, the attack judging section 260 judges that the in-vehicle bus 30 is under attack in a case in which the total of the number of times of authentication failure acquired from the authenticating section 230, and the number of times of authentication failure acquired from the attack collecting section 250, exceeds a predetermined threshold value.

The driving control section 270 has the function of carrying out control of autonomous driving of the vehicle 12. The driving control section 270 acquires data relating to the vehicle 12 from the network N and recognition sensors installed in the vehicle 12 and the like, and creates a traveling plan for the vehicle 12 on the basis of the acquired data, and generates control signals for controlling the actuators 40.

Further, the driving control section 270 executes degradation processing in a case in which the attack detecting section 240 senses that either one of the in-vehicle busses 30 is under attack. In the degradation processing, the driving control section 270 effects control so that control signals are transmitted through the other in-vehicle bus 30 that is not under attack. Due thereto, the driving control section 270 either hands over driving from autonomous driving to manual driving and returns the driving of the vehicle 12 to the driver, or quickly stops the vehicle 12 in a safe place and ends the autonomous driving. In a case in which degradation processing is carried out, the driving control section 270 informs the driver on the meter 50 of the fact that autonomous driving has been ended and driving has been switched over to manual driving, or immediately stops the vehicle and informs the driver of the fact that autonomous driving has ended.

(ECUs for Driving Control)

The steering ECU 24 and the braking ECU 26 that are the ECUs 20 for driving control differ from the autonomous driving ECU 22 with respect to the following points. Note that the other structures and functions are the same as those of the autonomous driving ECU 22, and detailed description thereof is omitted.

Figure 4:
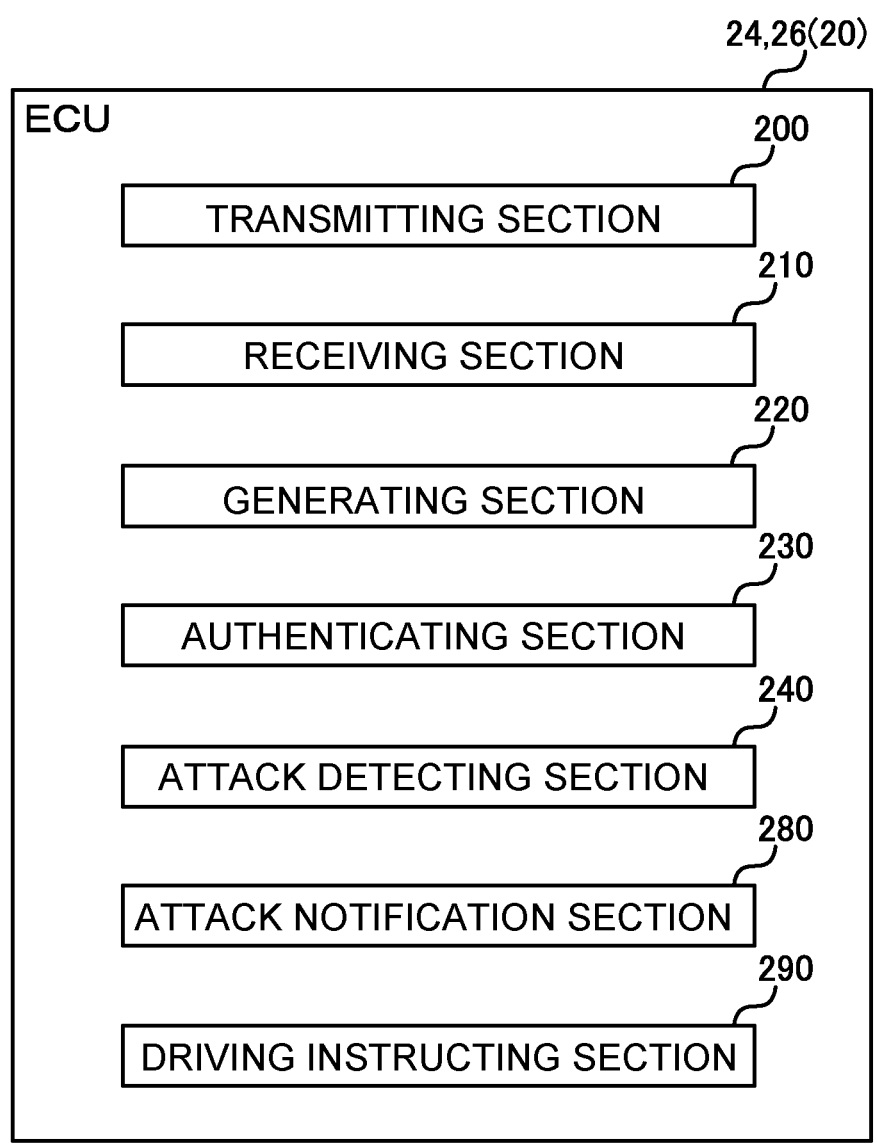
FIG. 4 is a block drawing showing an example of functional structures of an ECU for driving control of the embodiment.

FIG. 4 is a block drawing showing an example of the functional structures of the steering ECU 24 and the braking ECU 26 that are the ECUs 20 for driving control. As shown in FIG. 4, the ECU 20 for driving control has the transmitting section 200, the receiving section 210, the generating section 220, the authenticating section 230, the attack detecting section 240, an attack notifying section 280, and a driving instructing section 290. The functions of the transmitting section 200, the receiving section 210, the generating section 220, the authenticating section 230, and the attack detecting section 240 are the same as those of the autonomous driving ECU 22.

The attack notifying section 280 has the function of notifying the autonomous driving ECU 22 of the sensed number of times of unauthorized frames that was acquired from the attack detecting section 240. Further, the attack notifying section 280 notifies the autonomous driving ECU 22 of the number of times that the authenticating section 230 judged that there was authentication failure.

The driving instructing section 290 has the function of driving the respective actuators 40 on the basis of the control signals that are included in the messages received at the receiving section 210. For example, the driving instructing section 290 of the steering ECU 24 drives the actuator 40 and turns the steering wheel in accordance with the turn angle amount of the steering that is included in a control signal. Further, for example, the braking ECU 26 drives the actuator 40 and brakes the respective wheels in accordance with the braking amount that is included in a control signal.

(Flow of Control)

An example of the flow of processings relating to attack monitoring and attack handling that are executed at the respective ECUs 20 in the present embodiment is described in the sequence drawing of FIG. 5. Note that FIG. 5 is an example in which the CPU 20A transmits control signals from the autonomous driving ECU 22 through both the first bus 30A and the second bus 30B to the steering ECU 24 and the braking ECU 26, and autonomous driving of the vehicle 12 is carried out.

In step S10 of FIG. 5, the autonomous driving ECU 22 transmits a control signal toward the steering ECU 24 through the first bus 30A and the second bus 30B. Further, in step S11, the autonomous driving ECU 22 transmits a control signal toward the braking ECU 26 through the first bus 30A and the second bus 30B.

In step S12, the autonomous driving ECU 22 stores the reception time of the received frame. Although not illustrated, the autonomous driving ECU 22 receives the frame from the central GW 38 or another of the ECUs 20.

In step S13, the steering ECU 24 stores the reception time of the received frame that includes the control signal. Similarly, in step S14, the braking ECU 26 stores the reception time of the received frame that includes the control signal.

In step S15, among the control signals received from both the first bus 30A and the second bus 30B, the steering ECU 24 causes the control signal that was received from the second bus 30B to be reflected in the driving control of the actuator 40. Similarly, in step S16, among the control signals received from both the first bus 30A and the second bus 30B, the braking ECU 26 causes the control signal that was received from the second bus 30B to be reflected in the driving control of the actuator 40.

In step S17, the autonomous driving ECU 22 executes unauthorized frame detecting processing. Namely, the autonomous driving ECU 22 compares the communication period that was computed from the reception times and the reference period that is stored in the frame parameters 120, and if they do not match, detects the frame to be an unauthorized frame, and counts the number of times that an unauthorized frame is detected.

Similarly, in step S18, the steering ECU 24 executes unauthorized frame detecting processing, and, in step S19, the braking ECU 26 executes unauthorized frame detecting processing.

In step S20, the steering ECU 24 notifies the autonomous driving ECU 22 of the number of times that an unauthorized frame has been detected. Similarly, in step S21, the braking ECU 26 notifies the autonomous driving ECU 22 of the number of times that an unauthorized frame has been detected.

In step S22, the autonomous driving ECU 22 collects the number of times that an unauthorized frame has been detected, from the other ECUs 20.

In step S23, the autonomous driving ECU 22 carries out attack judgement on the in-vehicle bus 30. For example, in a case in which the total numbers of times that an unauthorized frame has been sensed at the second bus 30B, which have been sensed by the respective ECUs 20, exceeds a preset threshold value, the autonomous driving ECU 22 judges that the second bus 30B is under attack.

In a case in which the second bus 30B is under attack, the following control is executed.

In step S24, the autonomous driving ECU 22 starts degradation processing. Namely, in a case in which it is possible to hand driving over from autonomous driving to manual driving, such as in a case in which the driver is in a proper driving posture or the like, the autonomous driving ECU 22 starts handover processing. In this case, the autonomous driving ECU 22 displays, on the meter 50, the fact that handing-over is to be carried out, and notifies the driver. Further, in a case in which handing-over is not possible, the autonomous driving ECU 22 carries out control to stop the vehicle 12. In this case, the autonomous driving ECU 22 displays, on the meter 50, the fact that the vehicle 12 is to be stopped, and informs the driver. Note that the notification at the meter 50 is not limited to display only, and may be accompanied by a voice.

In step S25, the autonomous driving ECU 22 transmits a control signal toward the steering ECU 24 through only the first bus 30A. Further, in step S26, the autonomous driving ECU 22 transmits a control signal toward the braking ECU 26 through only the first bus 30A.

In step S27, the steering ECU 24 causes the control signal, which was received from the first bus 30A, to be reflected in the driving control of the actuator 40. Similarly, in step S28, the braking ECU 26 causes the control signal, which was received from the first bus 30A, to be reflected in the driving control of the actuator 40. Due thereto, at the vehicle 12, the minimum autonomous driving is continued, and the autonomous driving ECU 22 quickly stops the vehicle 12 in a safe place.

Overview of Present Embodiment

In the vehicle control system 10 of the present embodiment, due to the autonomous driving ECU 22 transmitting control signals to the ECUs 20 for driving control, the ECUs 20 for driving control drive the actuators 40 and cause the vehicle 12 to travel. In the present embodiment, there are provided the first bus 30A and the second bus 30B that are in-vehicle busses 30 that connect the ECUs 20, which include the autonomous driving ECU 22 and the ECUs 20 for driving control, such that the ECUs 20 can communicate with one another. Here, at the first bus 30A, communication with the network N is possible through the DCM 34, and communication with the network N is possible through the central GW 38 and the wireless equipment 18. On the other hand, the second bus 30B is independent from the first bus 30A, and is structured as a network that is cut-off from the vehicle exterior.

In the present exemplary embodiment, the attack detecting section 240 that is provided at each ECU 20 compares the communication period of communication at each in-vehicle bus 30 and the reference period that is stored in advance in the frame parameters 120, and, in a case in which they do not match, detects an unauthorized frame. Further, on the basis of the results of the comparisons at the attack detecting sections 240 of the respective ECUs 20, the attack judging section 260 judges an attack on the in-vehicle bus 30. Therefore, in accordance with the present embodiment, an attack on the vehicle network can be judged even if message authentication is not necessarily used.

Here, in a case of communicating data by message authentication, in order to carry out communication by allotting the data to the payload that only has a data length of 8 bytes, the original frame that used 8 bytes must be transmitted by being divided into two frames. As a result, in a case in which the number of frames that are communicated by using message authentication is large, the number of transmitted frames increases greatly, and the bus load increases.

Further, complex calculation is carried out such that the encryption key is not analyzed from the communication log by the attacker or the like at the appended MAC. Therefore, in the case of the existing ECU 20 that does not take into consideration the original encryption computing and the like, the processing load of the MAC computation is large, and a state arises in which processings of the intrinsic functions are strained. In contrast, in accordance with the present embodiment, judgement of a communication abnormality, such as an attack from the exterior or the like, can be carried out while reducing the load on the vehicle network and the ECUs 20.

However, in the vehicle control system 10 of the present embodiment, the attack judging section 260 can judge an attack on the in-vehicle bus 30 by carrying out message authentication, as well as unauthorized frame detection, on control signals that relate to emergency stopping of the vehicle 12. On the other hand, for control signals that relate to other than emergency stopping, it suffices for the attack judging section 260 to be able to judge an attack on the in-vehicle bus 30 on the basis of unauthorized frame detection. Accordingly, in accordance with the present embodiment, because message authentication is not needed for some of the communications at the in-vehicle busses 30, communication abnormality judgement can be carried out while reducing the load on the vehicle network.

In particular, with regard to information that is high-risk in a case in which the in-vehicle bus 30 is under attack, such as a control signal relating to emergency stopping of the vehicle 12, the load on the vehicle network can be reduced while security is ensured, by providing a more reliable authenticating means such as message authentication.

Further, the reliability of communications at an autonomous vehicle can be improved due to control signals, which relate to emergency stopping, being transmitted via the in-vehicle bus 30 at which security is ensured.

Moreover, in the vehicle control system 10 of the present embodiment, the plural ECUs 20 are connected so as to be able to communicate by both the first bus 30A and the second bus 30B. Usually, communication whose relatability is ensured can be carried out by using mainly the second bus 30B that is cut-off from the exterior. However, in the event that there is an attack on the second bus 30B, communication between the ECUs 20 can be carried out by the first bus 30A.

Namely, even in a case in which an unauthorized frame is inserted on the in-vehicle bus 30, measures can be taken before the vehicle 12 exhibits dangerous vehicle behavior. Therefore, in accordance with the present embodiment, even in a case in which there is an attack on the second bus 30B, autonomous driving of the vehicle 12 can be continued by communication of the first bus 30A.

Modified Examples

The attack judging section 260 of the above-described embodiment judges an attack of the in-vehicle bus 30 on the basis of the total value of the numbers of times that an unauthorized frame is detected or the numbers of times that authentication fails at the respective ECUs 20. However, the present disclosure is not limited to this, and an attack on the in-vehicle bus 30 may be judged at each of the ECUs 20.

Concretely, the attack detecting section 240 of the present modified example judges that there is an attack state in a case in which a predetermined number or more unauthorized frames are detected within a given time period. Further, the attack detecting section 240 judges that there is an attack state in a case in which the number of non-matches between the MACs and the MACs for verification in the communication data of frames that are received within a given time period is greater than or equal to a predetermined number. Moreover, the attack judging section 260 of the autonomous driving ECU 22 judges that the entire system is under attack in a case in which there is judged to be an attack state at any of the ECUs 20. In the present modified examples as well, operation and effects that are similar to that of the present embodiment are achieved.

(Notes)

In the above-described embodiment, message authentication is applied to control signals relating to emergency stopping of the vehicle 12. However, the present disclosure is not limited to this, and message authentication is not absolutely necessary provided that there is a case in which the second bus 30B that is cut-off from the exterior is used. By omitting message authentication for communications of the second bus 30B, the load on the ECU 20 relating to authentication can be lessened.

Note that any of various types of processors other than a CPU may execute the respective processings that the CPUs 20A execute by reading-in software (programs) in the above-described embodiment. Examples of processors in this case include PLDs (Programmable Logic Devices) whose circuit structure can be changed after production such as FPGAs (Field-Programmable Gate Arrays) and the like, or dedicated electrical circuits that are processors having circuit structures that are designed for the sole purpose of executing specific processings such as ASICs (Application Specific Integrated Circuits) and the like, or the like. Further, the respective processings may be executed by one of these various types of processors, or may be executed by combining two or more of the same type or different types of processors (e.g., plural FPGAs, or a combination of a CPU and an FPGA, or the like). Further, the hardware structures of these various types of processors are, more concretely, electrical circuits that combine circuit elements such as semiconductor elements and the like.

Further, the above embodiment describes a form in which the programs are stored in advance (are installed) on a non-transitory recording medium that can be read by a computer. For example, the execution program 100 at the ECU 20 of the vehicle 12 is stored in advance in the ROM 20B. However, the present disclosure is not limited to this, and the respective programs may be provided in the form of being recorded on a non-transitory recording medium such as a CD-ROM (Compact Disc Read Only Memory), a DVD-ROM (Digital Versatile Disc Read Only Memory), a USB (Universal Serial Bus) memory, or the like. Further, the programs may be in a form of being downloaded from an external device via a network.

The flow of processings described in the above embodiment also is an example, and unnecessary steps may be deleted, new steps may be added, or the order of processings may be rearranged, within a scope that does not depart from the gist of the present disclosure.

What is claimed is:

1. A vehicle control system comprising:
    a driving control device that includes a first processor and controls a driving section provided at a vehicle;
    a control instructing device that includes a second processor and controls the driving control device by transmitting a control signal to the driving control device via communication on a communication path; and
    the communication path that connects a plurality of control devices including the control instructing device and the driving control device, such that the plurality of control devices can communicate with one another via the communication path,
    wherein the vehicle control system is structured such that the first processor and the second processor respectively make a comparison between a communication period of communication with another control device via the communication path, and a reference period that is stored in advance, and
    wherein, a result of the comparison made by the first processor is transmitted to the second processor, and the second processor judges that there is an attack on the communication path based on both the result of the comparison made by the first processor and a result of the comparison made by the second processor.

2. The vehicle control system of claim 1, wherein:
the first processor and the second processor respectively carry out message authentication on communication with other control devices,
for a first type of information, the second processor judges an attack on the communication path based on message authentication executed by an authenticating section, and
for a second type of information that is different than the first type of information, the second processor judges that there is an attack on the communication path based on the result of the comparison made by the first processor and the result of the comparison made by the second processor.

3. The vehicle control system of claim 2, wherein the first type of information is information that is higher risk than the second type of information, at a time of judging that there is an attack on the communication path.

4. The vehicle control system of claim 1, wherein:
the control instructing device is an ECU for driving assist, and
the control instructing device transmits, via the communication path and to the driving control device, control signals for controlling the driving section for vehicle traveling.

5. The vehicle control system of claim 1, further comprising:
another communication path that is independent from the communication path and that connects a plurality of the control devices, including the control instructing device and the driving control device, such that the plurality of control devices can communicate with one another via the another communication path,
wherein, in a case in which the second processor judges that there is an attack on the communication path, the second processor carries out communication with the driving control device via only the another communication path.

6. The vehicle control system of claim 1, wherein:
the first processor and the second processor respectively judge a case, in which non-matching is detected in comparison results of a predetermined number of times or more within a given time period, as an attack on the communication path, and
the second processor judges that the communication path is under attack in a case in which at least one of the first processor or the second processor detects an attack.

7. A method of detecting an attack on a communication path that connects together a plurality of control devices including a driving control device, which controls a driving section provided at a vehicle, and a control instructing device, which controls the driving control device by transmitting a control signal to the driving control device via communication on the communication path, the method comprising:
comparing processing that is executed at the control instructing device and the driving control device, respectively, and that makes a comparison between a communication period of communication with another control device via the communication path, and a reference period that is stored in advance; and
attack judging processing that is executed at the control instructing device, and that judges that there is an attack on the communication path based on both a result of the comparison made by the driving control device, which is transmitted to the control instructing device, and a result of the comparison made by the control instructing device.

8. A non-transitory recording medium on which is recorded a program that judges an attack on a communication path that connects together a plurality of control devices including a driving control device, which controls a driving section provided at a vehicle, and a control instructing device, which controls the driving control device by transmitting a control signal to the driving control device via communication on the communication path, the program being executable by a computer, which is provided with the control instructing device, to perform processing comprising:
comparing processing that makes a comparison between a communication period of communication with another control device via the communication path, and a reference period that is stored in advance, the comparing processing being performed by each of the driving control device and the control instructing device; and
attack judging processing that judges an attack on the communication path based on both a result of the comparison made by the driving control device and a result of the comparison made by the control instructing device.

* * * * *